(12) United States Patent
Leiber

(10) Patent No.: US 6,186,024 B1
(45) Date of Patent: Feb. 13, 2001

(54) DRIVING DEVICE FOR DISPLACING A PLATFORM IN A PLANE

(75) Inventor: Hans-Jürgen Leiber, Tramelan (CH)

(73) Assignee: Kummer Freres S.A. /Fabrique de machines, Tramelan (CH)

( * ) Notice: Under 35 U.S.C. 154(b), the term of this patent shall be extended for 0 days.

(21) Appl. No.: 09/337,042

(22) Filed: Jun. 28, 1999

(30) Foreign Application Priority Data

Jul. 14, 1998 (EP) .................................................. 98810673

(51) Int. Cl.[7] .................................................. B23Q 1/60
(52) U.S. Cl. .................................. 74/490.09; 108/143
(58) Field of Search .............................. 74/490.09, 490.1;
33/1 M; 108/143; 248/657, 661; 269/73;
359/393; 414/749

(56) References Cited

U.S. PATENT DOCUMENTS

| | | | |
|---|---|---|---|
| 3,010,363 | * 11/1961 | Malfeld | 359/393 |
| 3,645,001 | 2/1972 | Bosworth et al. | 33/567.1 |
| 4,838,515 | * 6/1989 | Prentice | 74/479.01 |
| 4,972,574 | 11/1990 | Isono et al. | 74/479.01 |
| 4,993,673 | * 2/1991 | Hirose | 108/143 |
| 5,339,749 | 8/1994 | Hirose | 108/143 |
| 5,731,641 | * 3/1998 | Botos et al. | 74/479.01 |

FOREIGN PATENT DOCUMENTS 93 00 510    3/1993 (DE) .
61-230829  * 10/1986 (JP) .

* cited by examiner

*Primary Examiner*—Sherry Estremsky
(74) *Attorney, Agent, or Firm*—Oliff & Berridge, PLC

(57) ABSTRACT

The device for displacing a platform includes two carriages driven, simultaneously or separately, on guiding rails oriented along an axis X. The two carriages carry a platform mounting slides engaged with slideways on the carriages. At least one of the slides of the platform carriage and at least one of the slideways of the carriage is oriented at an angle other than 90° relative to an axis X. The displacement along any direction of a plane comprised of the axes X and Z of a tool holder spindle or work piece spindle mounted on the platform can be obtained only by the relative or simultaneous moving of the two carriages on the guiding rails.

22 Claims, 6 Drawing Sheets

DRIVING DEVICE FOR DISPLACING A PLATFORM IN A PLANE

The content of Application No 98810673.8, filed Jul. 14, 1998 in Europe is hereby incorporated by reference.

BACKGROUND OF THE INVENTION

1. Field of the Invention

The present invention relates to a device for driving a platform, that can carry any object or, in the case of machine-tools, a tool holder spindle or a work piece spindle, in any direction of a plane, said plane being comprised of the two axes X and Z known in machine-tool engineering.

2. Description of the Prior Art

The displacement of such a platform, which can be a physical element or, in the case of machine-tools, which can be the tool holder spindle or the work piece spindle itself, is usually obtained by two crosswise superimposed slide-ways perpendicular to one another, driven each separately in one or the other direction or driven simultaneously in an intermediate combined direction.

A major inconvenience of this known arrangement of crosswise slide-ways resides in the superimposition of the two slide-ways, resulting in the tool holder spindle or work piece spindle being relatively far away from the guiding rails of the lower slide-way on the support frame of the machine; there is thus an important torsional moment of the spindle relative to these guiding rails. The superimposition of the two slide-ways further results in a lack of rigidity of the construction between the above mentioned guiding rails and the spindle. Also, the upper slide-way has a certain mass and is thus always co-driven when the lower slide-way is displaced, even when the upper slide-way is inactive, which limits the possible accelerations of the motor, of determined power, driving the lower slide-way. Finally, the orthogonal disposition of the driving means of the two slide-ways renders the design and construction of the machine more complicated.

JP-A-61.230.829 shows a device in which the two driving motors are disposed on parallel axes. The major inconvenience mentioned above relating to the superimposition of two orthogonal slide-ways remains.

OBJECT AND SUMMARY OF THE INVENTION

A first object of the present invention is to provide a device for displacing a platform in any direction of a plane comprised of two orthogonal axes, that does not encounter the disadvantages of the known devices.

A second object of the invention is that the aforementioned device be of simple design and construction and that it be compact and rigid.

It is another object of the invention to propose driving means and means for controlling the position of the device that are adapted to the particular geometry of the device.

It is yet a further object of the invention to propose a tool holder spindle or a work piece spindle fitted with the aforementioned device.

Finally, it is another object of the invention to propose a machine-tool, of any type, equipped with at least one tool holder spindle and/or work piece spindle fitted with the aforementioned device.

This is achieved by the proposed device having the characteristics mentioned in the characterizing part of claim 1. Particular embodiments or variations are described in the dependent claims. Claims 20 to 22 describe spindles or a machine-tool as sought.

BRIEF DESCRIPTION OF THE DRAWINGS

The following description of various embodiments of the device according to the invention is to be read in relation to the attached drawing containing the figures, in which.

DETAILED DESCRIPTION OF PREFERRED EMBODIMENTS

Figure 1:
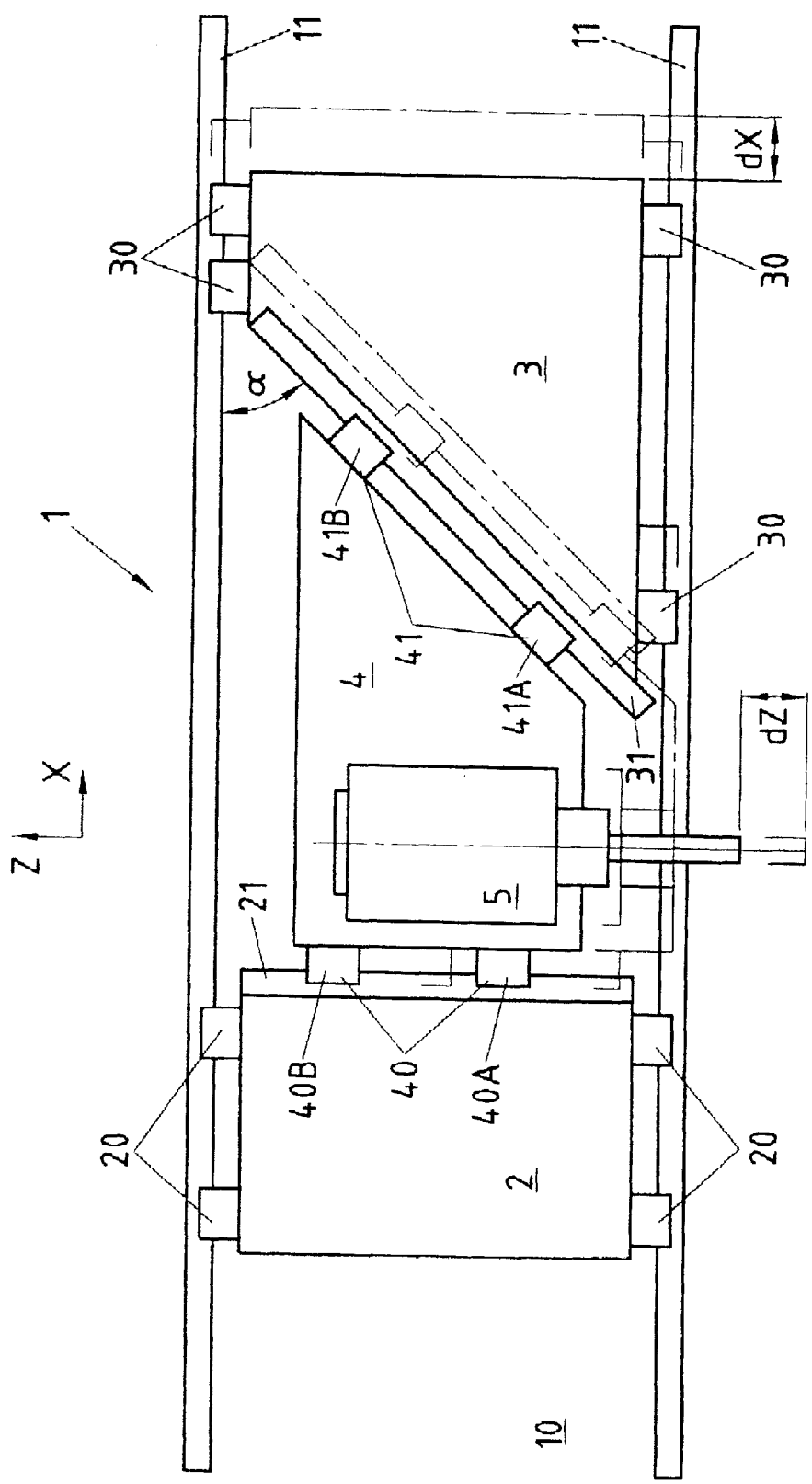
FIG. 1 is a top view of a portion of a machine equipped with a device according to a first embodiment of the invention, schematically represented.
Figure 2:
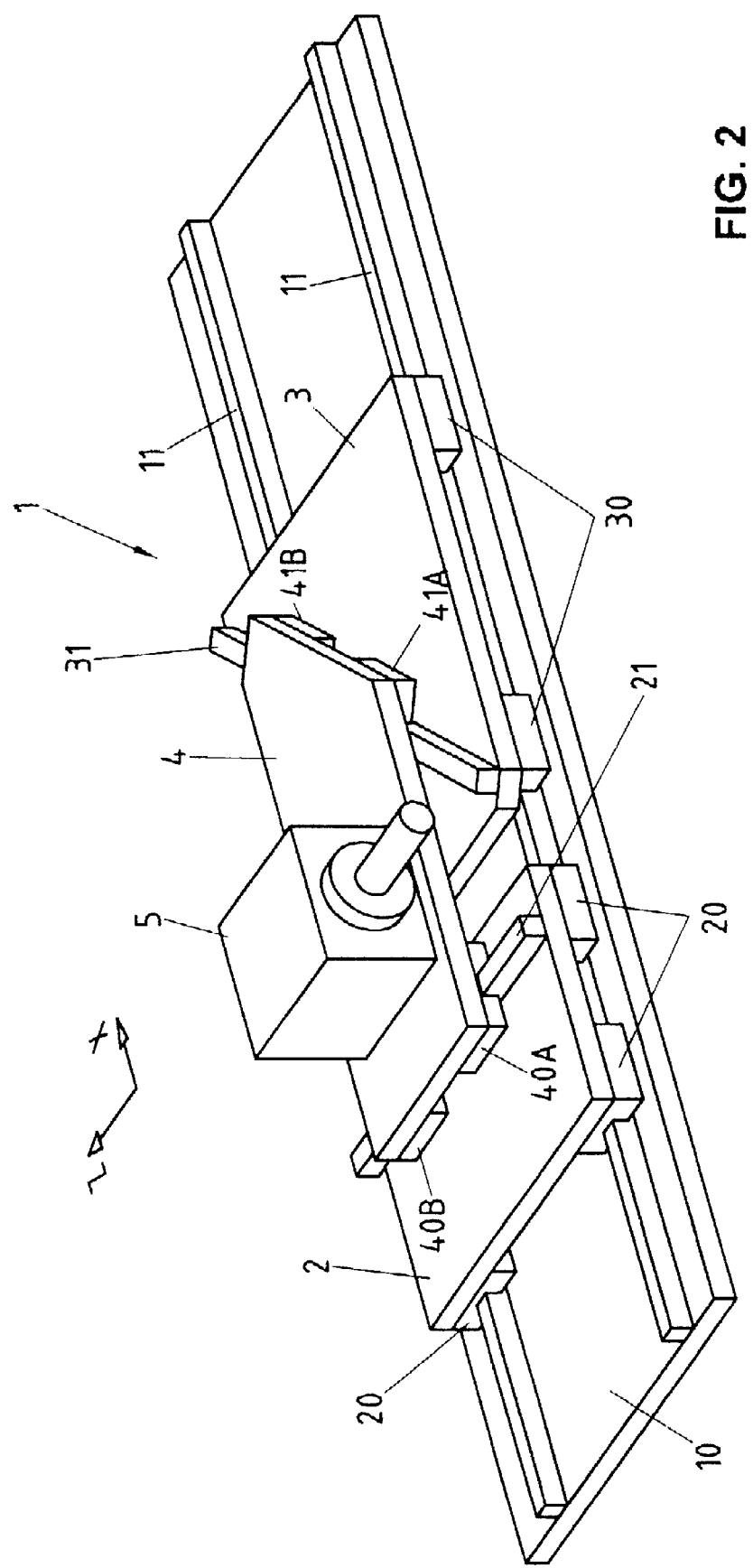
FIG. 2 is a perspective view of the device of FIG. 1.

In FIGS. 1 and 2, one can see a portion of a machine-tool 1, including a support frame 10 on which two guiding rails 11 are disposed in parallel along axis X represented on the orthogonal reference. The device according to the invention is comprised of a first carriage 2, of a second carriage 3 and of a platform 4 partially superimposed on the two carriages 2 and 3, according to one or the other manner described further below. Platform 4 supports a spindle S, in this case a tool holder spindle, but which could as well be a work piece spindle or any other object.

The two carriages 2 and 3 are able to move in both directions along axis X, being fitted with slides 20, 30 respectively, on guiding rails 11.

The platform 4 is fitted, on the portion of its lower face superimposed on the first carriage 2, of a slide 40 cooperating with a slide-way 21 disposed on the upper face of carriage 2. One can see in the figure that for reasons of stability of platform 4, slide 40 is in fact constituted of two successive slides 40A and 40B placed one after the other on the same slide-way 21. Similarly, the portion of the lower face of platform 4 superimposed on the second carriage 3 is fitted with a slide 41 cooperating with a slide-way 31 disposed on the upper face of carriage 3, slide 41 being also constituted of two successive slides 41A and 41B placed one after the other on the same slide-way 31.

Slide-way 21 and slides 40A and 40B are aligned along axis Z, i.e., perpendicular to axis X, whereas slide-way 31 and slides 41A and 41B are aligned along an axis at an angle α with guiding rails 11, with axis X respectively.

From the arrangement described here above, one understands that when displacing both carriages 2 and 3 along axis X at the same speed and in the same direction, the platform 4 as well as the spindle or object 5 move in the same motion along axis X. Further, when blocking carriage 2 on the guiding rails 11 and displacing carriage 3 along axis X, in one direction or the other, one can see that the platform 4, the spindle or object 5 respectively, moves along axis Z, in one or the other direction. The motion of carriage 3 along axis X, in one or the other direction, is thus transformed into a motion of platform 4 along axis Z, in one or the other direction, thanks to the slides 41A and 41B sliding on the slide-way 31 at an angle α. Since angle α is preferably of 45°, the displacement dZ of platform 4 along axis Z occurs at the same speed and is of the same amplitude as the displacement dX of carriage 3 along axis X. From the geometry of the system and with an angle α of 45°, one sees that by moving the two carriages closer together by dX, one obtains a displacement of dZ=dX towards the portion of the machine at the top of FIG. 1, whereas by moving the two carriages further apart by dX, one obtains a displacement of dZ=dX towards the portion of the machine at the bottom of FIG. 1.

Hence, with the device according to this first embodiment of the invention, one obtains a displacement of the platform 4, of the spindle or object 5 respectively, along axis X by displacing simultaneously the two carriages 2 and 3 at the same speed, in the same direction and by the same distance. One achieves a displacement along axis Z by blocking the first carriage 2 and by displacing the second carriage 3, and a displacement in an intermediate direction between axes X and Z is obtained by a combined displacement of the two carriages 2 and 3 at different speeds or in different directions.

As previously indicated, angle a is preferably of 45° in order to obtain a displacement dZ corresponding to displacement dX. For certain uses it may however be more convenient to have, for a given displacement dX of carriage 3, a displacement dZ of platform 4 different from dX. This can occur notably when platform 4 must be positioned very accurately along axis Z. Since generally tgα=dZ /dX, one has for example for an angle α of 26.56° a displacement dZ=dX/2, i.e., the positioning along axis Z is twice as precise as the positioning along axis X. On the other hand, for a faster displacing of platform 4 along axis Z one will chose an angle α of more than 45°. The value of angle α can be chosen according to the needs.

FIG. 2, which is a schematic perspective view of the device according to this first embodiment of the invention, shows the side by side position of the two carriages 2 and 3 on the guiding means 11 as well as the platform 4 partially superimposed on these two carriages.

This first embodiment of the device according to the invention has been described with the carriage 2 fitted with the slide-way perpendicular to axis X placed on the left, but it is obvious that the symmetrical construction is also possible.

The means for driving the two carriages and for controlling their displacement will be described further below.

Figure 3:
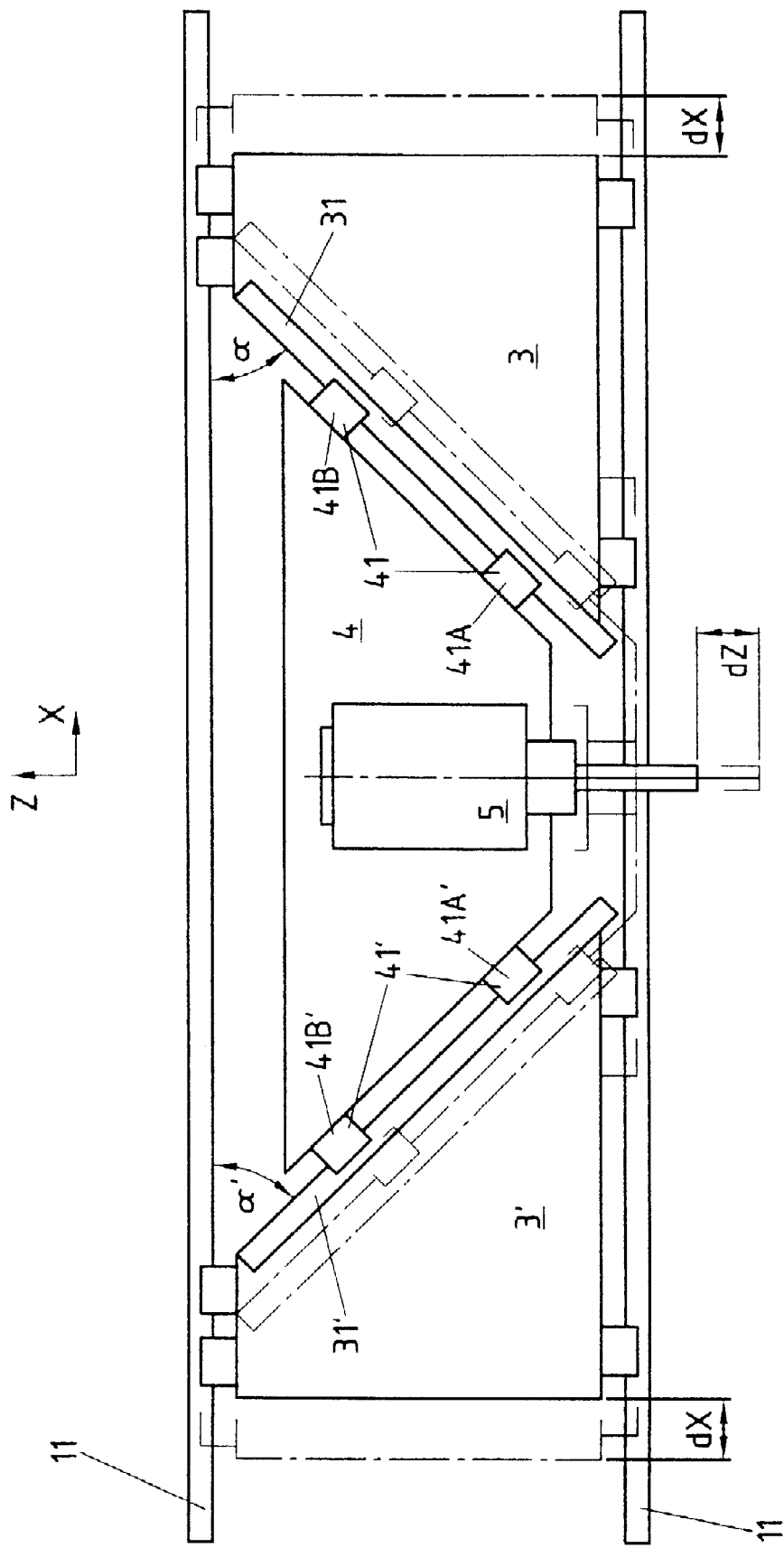
FIG. 3 is a top view of a portion of a machine equipped with a device according to a second embodiment of the invention, schematically represented.

In FIG. 3, one can see a device similar to the preceding one, except that a carriage 3' is mounted instead of the carriage 2 of the first embodiment according to the invention. Carriage 3' is constructed and installed symmetrically to carriage 3 relative to axis Z and includes notably a slide-way 31' aligned at an angle α' being preferably also of 45°. Platform 4 differs from that of the first embodiment in that it is essentially symmetrical relative to axis Z; it comprises two slides 41A' and 41B' facing slide-way 31'.

The displacement of spindle 5 along axis X is obtained as above by simultaneously commanding both driving means of the two carriages, whereas the displacement along axis Z is achieved by moving the two carriages 3 and 3' closer together or further apart at the same speed and by the same distance dX. As previously, if the angles α and α' are of 45°, by moving the two carriages closer together by dX, one obtains a displacement of spindle 5 of dZ=dX towards the portion of the machine at the top of the figure, whereas by moving the two carriages further apart by dX, one obtains a displacement of spindle 5 of dZ=dX towards the portion of the machine at the bottom of the figure. The same observations as above can be made concerning the value of the angles α and α'.

Relative to the first embodiment of the device according to the invention described above, the second embodiment allows for a more symmetrical distribution of forces between platform 4 and the guiding rails 11, whereas the space requirement of the device is greater because carriage 3' is longer, in direction X, than carriage 2.

Figure 4:
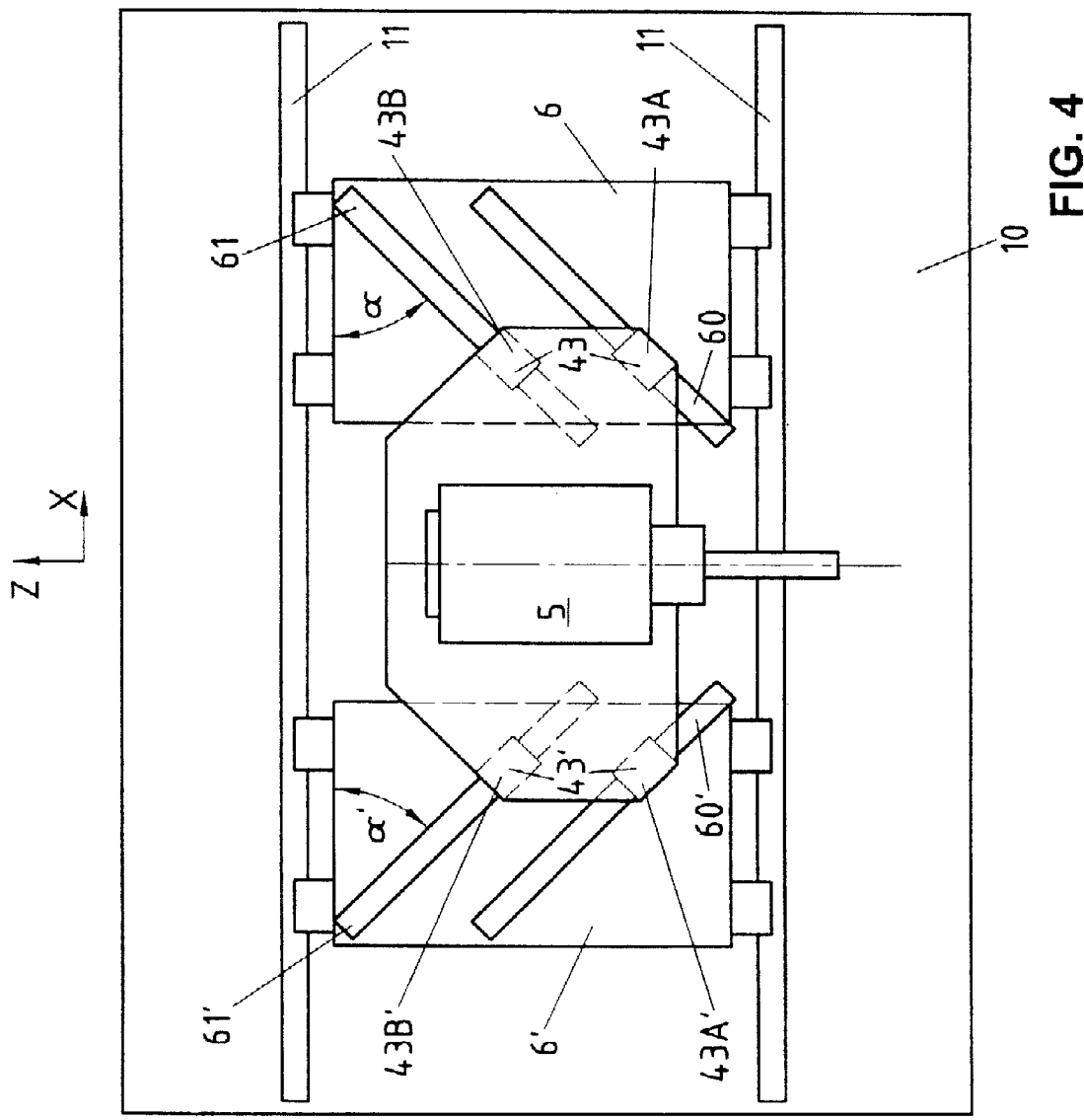
FIG. 4 is a top view of a portion of a machine equipped with a device according to a third embodiment of the invention, schematically represented.

A third embodiment of the device according to the invention, as seen in FIG. 4, allows for the space requirement of carriages 3 and 3' to be drastically reduced.

In this third embodiment of the device according to the invention, the two carriages 6 and 6' are symmetrical to each other relative to axis Z. They comprise each two slide-ways 60 and 61, 60' and 61' respectively, disposed side by side and parallel to each other. The two slide-ways of a carriage are inclined at an angle α or α' relative to axis X. Preferably, as above, α=α'=45°. Platform 4 correspondingly is fitted with slides 43A and 43B facing and cooperating with slide-ways 60 and 61 as well as with slides 43A' and 43B' facing and cooperating with slide-ways 60' and 61'. When comparing FIG. 4 with FIG. 3, one can easily see that replacing slides 41A and 41B, 41A' and 41B' respectively, aligned on slide-ways 31 and 31', by two slides 43A and 43B, 43A' and 43B' respectively, disposed side by side on two parallel slide-ways 60 and 61, 60' and 61' respectively, one can reduce noticeably the space requirement in direction X of the carriages 6 and 6' and of platform 4. This embodiment provides a device that is more rigid, more compact and with a better distribution of effort between spindle 5 and the guiding means 11 than the previous one. The same observations as above concerning the value of the angles α and α' apply here too.

As a variation of this third embodiment of the invention, it is also possible for each carriage to be fitted with more than two parallel slide-ways, the platform being then fitted with corresponding slides.

A fourth embodiment of the device according to the invention can also be considered, in which the device includes a first carriage identical to carriage 2 of the first embodiment as well as a second carriage identical to carriage 6 of the third embodiment in FIG. 4.

One can thus see that in order to displace platform 4 or spindle 5 along one or the other axes X or Z or along an intermediary axis, it is sufficient to drive independently or simultaneously both carriages on the guiding rails 11, i.e., along only one axis X, for any of the embodiments of the device according to the invention as described above. This arrangement allows for the driving means to be advantageously simplified since the two displacements occur along the same axis.

Figure 5:
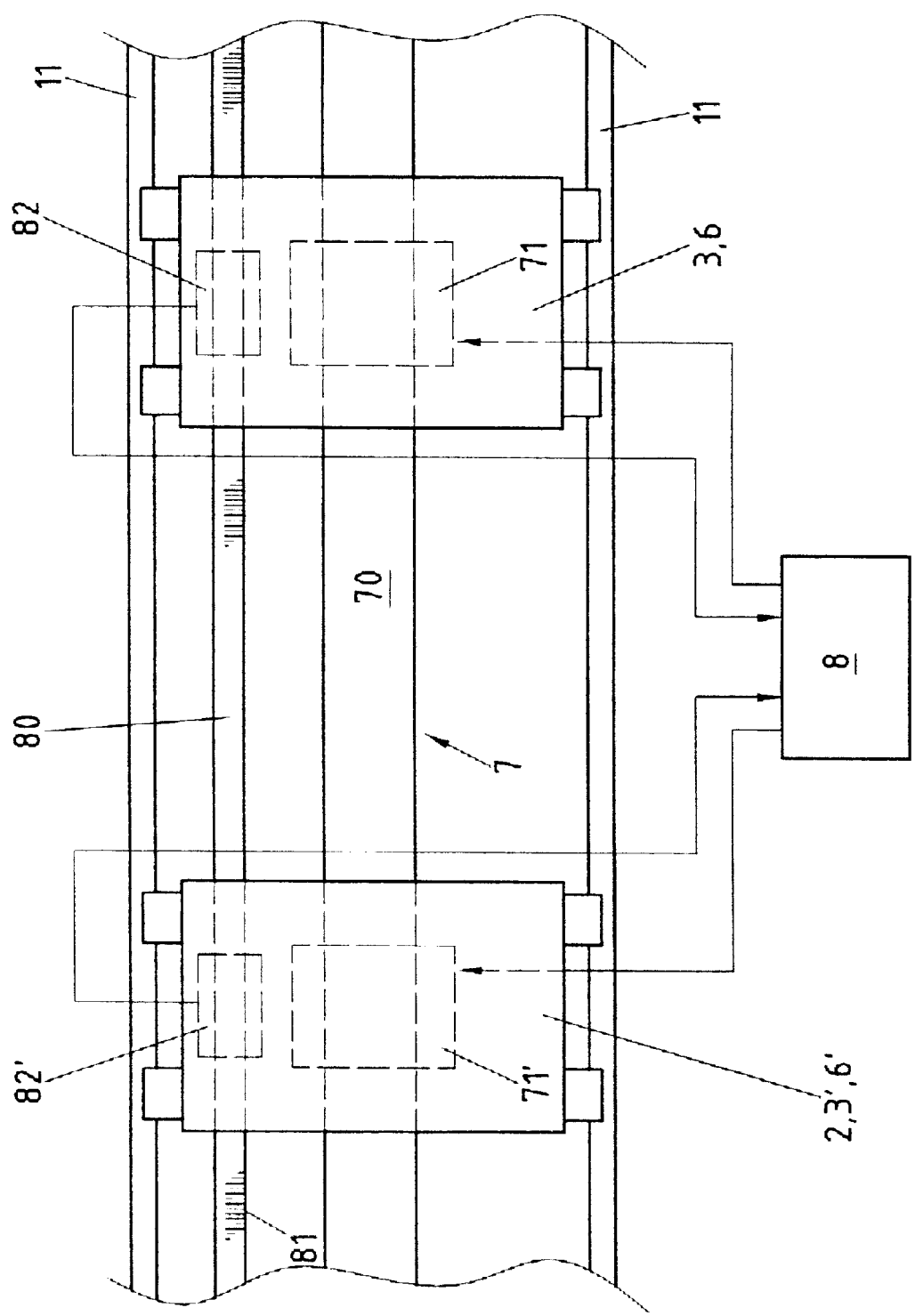
FIG. 5 shows schematically a first embodiment of the driving means of the carriages.

According to a first embodiment of the means driving the two carriages represented in FIG. 5 (the slide-ways, the platform as well as the object it carries are not represented in this figure nor in the next), a linear motor 7 with a flat armature 70 constituting the motor's secondary (static part) is disposed parallel to the two guiding rails 11, i.e., along axis X. Each carriage includes a flat inductor 71, 71' constituting each a primary (moving part) of the motor, disposed under the carriage facing armature 70 so as to leave only a narrow gap between armature 70 and inductors 71 and 71'. A control unit 8 commands each inductor 71, 71' separately or simultaneously, in one or the other direction, so as to drive each carriage separately or simultaneously, in one or the other direction. Thus the platform as well as the tool holder spindle or the work piece spindle are displaced along axes X and Z or along an intermediary axis as previously mentioned.

To control the displacements of spindle 5, it is necessary to know exactly the position of each carriage on the guiding rails 11. A device for measuring the position of the carriages along axis X is thus required. An optical measuring system is particularly well adapted to this problem. The system comprises a scale 80, disposed along axis X, with a plurality of reference FIGS. 81 side by side. Each carriage includes an optical sensor 82, 82', placed under the carriage opposite scale 80 with a narrow gap between the scale and the sensors. Each sensor can thus send a signal to the control unit 8, indicating the exact position of each carriage on the guiding rails 11. Other position measuring means, e.g. capacitive, inductive or others, can also be considered.

From the signals sent by sensors 82 and 82', indicating the position of each carriage on the guiding rails 11, the control unit 8 is able to calculate the coordinates $X_0$, $Z_0$ at which spindle 5, or more precisely the work piece or tool it carries, is positioned. Knowing the coordinates $X_1$, $Y_1$ to which the spindle must be conveyed, the control unit 8 is then able to calculate and command the necessary displacements of the carriages, taking into account the value of angle $\alpha$ and of angle $\alpha'$ according to the embodiment.

Although by knowing the position of the carriages along axis X one can determine exactly the position of the platform along axis Z, it may be convenient, for control purposes, to fit the platform as well as one or the other carriage with a means for controlling the position of the platform along axis Z. This means, not represented in the figures, is preferably constituted of a scale similar to scale 80, disposed parallel to axis Z on one of the carriages, as well as of a sensor, similar to one of the sensors 82 or 82', mounted on the platform.

Figure 6:
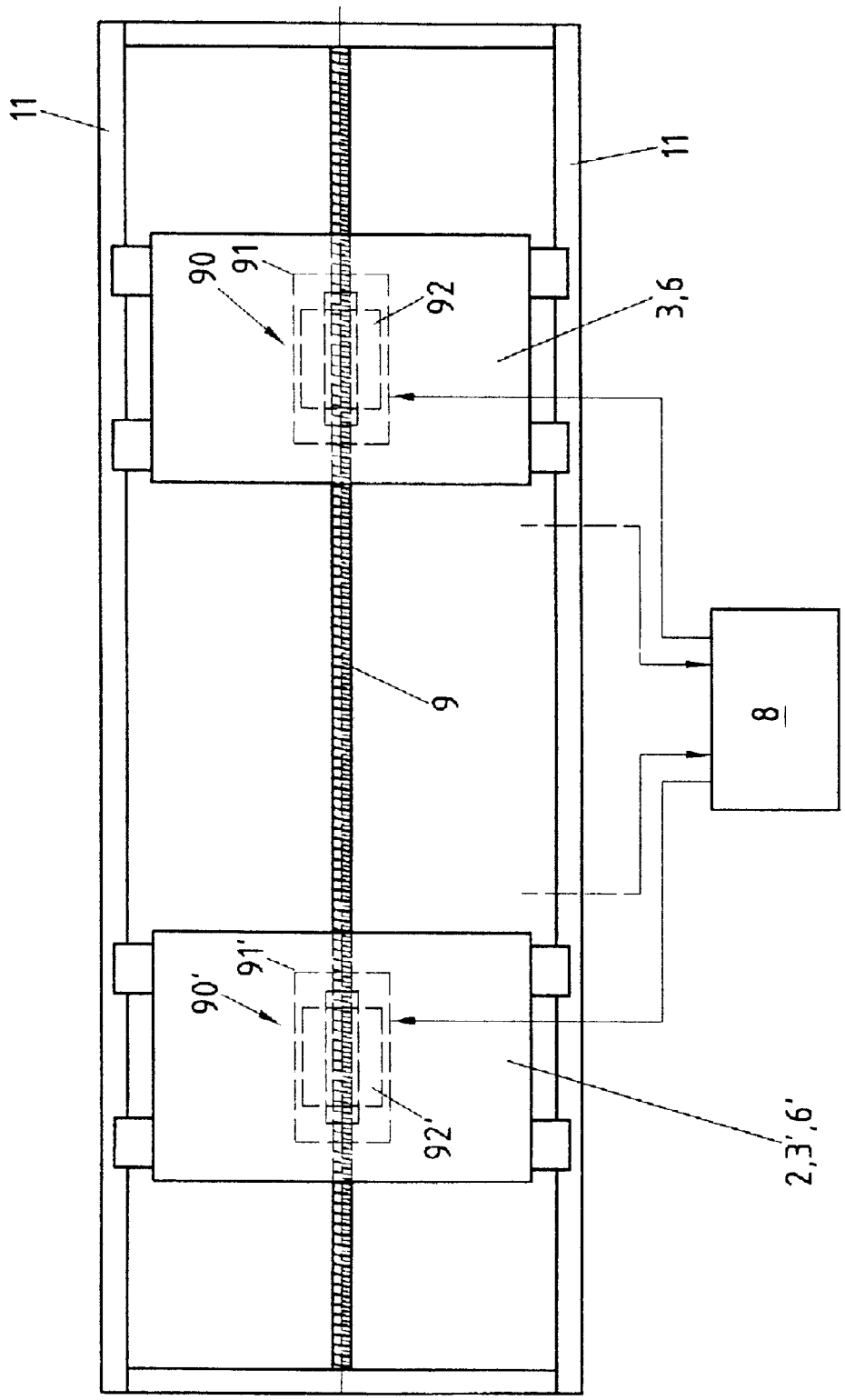
FIG. 6 shows a second embodiment of these means.

A second variation of the means driving the two carriages can be seen in FIG. 6. In this case, we have a leading screw 9 fixed parallel to the guiding rails 11. The screw 9 cannot be rotated. Each carriage includes an electric motor or servomotor 90, 90', composed of a stator 91, 91' mounted on the carriage as well as of a rotor 92, 92' with a longitudinal hole, this hole having an inner threading corresponding to the thread of screw 9. The rotation of a rotor thus results in the displacement of the corresponding carriage, the rotor being screwed or unscrewed on screw 9 in the direction in which it is commanded by control unit 8. In order to improve the accuracy of the carriages' displacement, and depending on the uses, the motors or servomotors can be of the step type.

No device for measuring the position of the carriages is represented in FIG. 6, but it is clear that a device as described above can also be installed.

The different embodiments of the driving device of platform 4 have been described and represented only from their cinematic aspect, without entering into the details of their construction which are directly available to one skilled in the art. The known usual lubrication methods for the slide-ways and slides as well as the known usual means of backlash elimination can be applied on this device. The device has been described as being fitted with slide-ways and slides; it is obvious that one or the other or a number of these slide-ways and slides can be replaced by known sliding means other than those described, for example a sleeve sliding on a tube, bearing means on a rail, telescopic type ball bearing travelers etc., as well as contact free sliding means, for example hydrostatic, pneumatic, electromagnetic etc.

Similarly, only two variations of the means for driving the carriages have been described; these two variations illustrate in particular the fact that the alignment of the driving means along one single axis allows for a considerable simplification of the construction. Other driving means of the carriages can also be considered according to the planned uses, for example mechanical, electric, pneumatic or hydraulic driving means.

By having both carriages commanding the displacement of the platform disposed side by side on the guiding rails, i.e., on a single plane, the height difference between the tool or the work piece and the guiding rails 11 is markedly reduced, which improves the compactness and the rigidity of the construction. Also, since an inactive carriage is never co-driven by the other carriage, the driven mass is lower and therefore the possible accelerations for displacing the tool or work piece are higher for a determined power of the motors.

What is claimed is:

1. Device for displacing a platform (4) in any direction of a plane comprised of two orthogonal axes (X, Z), comprising:

a first carriage (2; 3', 6') which can be driven along the first (X) of the two orthogonal axes, a second carriage (3; 6) which can be driven along the same first of the two orthogonal axes, said two carriages being disposed in a same plane and being guided by the same means (11), the platform including a first sliding means (21/40; 31'/41'; 60', 61'/43') relative to the first carriage and a second sliding means (31/41; 60, 61/43) relative to the second carriage, at least one of the sliding means being oriented along a third axis at an angle ($\alpha$, $\alpha'$) other than 90° relative to the first of the orthogonal axes, the third axis being in the same plane as the two orthogonal axes.

2. Device according to claim 1, wherein the sliding means oriented along the third axis ($\alpha$, $\alpha'$) of the platform on at least one of the carriages (3, 6, 6') includes at least one slide-way (31, 60, 61) disposed parallel to the third axis on at least one of the carriages (3, 6, 6') and at least one slide (41A, 41B, 43, 43') mounted on the platform and cooperating with said one slide-way (31, 60, 61).

3. Device according to claim 1, wherein one of the sliding means (21/40) of the platform on one of the carriages (2) includes a sliding means oriented along the second orthogonal axis (Z).

4. Device according to claim 1, wherein the displacement of the platform (4) along the first (X) of the two orthogonal axes is obtained by an identical and simultaneous displacement of the two carriages (2, 3, 3', 6, 6') along said first of the two orthogonal axes.

5. Device according to claim 1, wherein a displacement of the platform (4) along an axis different from the first (X) of the two orthogonal axes but in the same plane as these two axes is achieved by a differential displacement of the two carriages (2, 3, 3', 6, 6') along said first of the two orthogonal axes.

6. Device according to claim 5, wherein the displacement of the platform (4) along the second (Z) of the two orthogonal axes is obtained by a differential displacement of the two carriages (2, 3, 3', 6, 6') along said first of the two orthogonal axes.

7. Device according to claim 6, wherein the displacement of the platform (4) along the second (Z) of the two orthogonal axes is achieved by blocking along the first axis (x) the carriage (2) which is fitted with a sliding means (21/40)

oriented along the second orthogonal axis (Z) and by displacing along said first axis (X) the carriage (3, 3', 6, 6') of which the sliding means of the platform on said carriage are oriented along the third axis (α, α').

8. Device according to claim 1, wherein the value (dZ) of the displacement of the platform (4) along the second axis (Z) is equal to the value (dX) of the displacement of one or both carriages (3, 6, 6') along the first axis (X) multiplied by the tangent of the angle (α, α').

9. Device according to claim 1, wherein the angle (α, α') other than 90° is of 45°.

10. Device according to claim 9, wherein the value (dZ) of the displacement of the platform (4) is identical to the value (dX) of the displacement of the carriage or carriages (3, 3', 6, 6').

11. Device according to claim 1, wherein each carriage (2, 3, 3', 6, 6') is driven by motorized means (7, 9) along a single axis (X).

12. Device according to claim 11, wherein both carriages (2, 3', 6', 3, 6) along the first (X) of the two axes are driven by two motorized means (71, 71'; 90, 90') acting each on a carriage, the two motorized means being commanded independently or simultaneously.

13. Device according to claim 12, wherein the two motorized means are comprised of a double linear motor with a flat armature (70) disposed parallel along the first (X) of the two axes and two flat inductors (71, 71') disposed each under one of the carriages facing the armature.

14. Device according to claim 12, wherein the two motorized means are constituted of two electric motors (90, 90'), the stator (91, 91') of each being mounted on a carriage, both rotors (92, 92') being each fitted with a longitudinal hole with an inner threading, both rotors being aligned and engaged by their inner threading on a shaft (9) with an outer threading, said shaft being fixed and aligned parallel to the first axis (X).

15. Device according to claim 14, wherein the two motors (90, 90') are step motors.

16. Device according to claim 11, wherein the device is associated to a control unit (8) able to receive signals from sensors (82, 82') indicating the position of each carriage along the first axis (X) and commanding, separately or simultaneously, each motorized means (71, 71'; 90, 90') driving the carriages.

17. Device according to claim 16, wherein the control unit (8) includes a program able to calculate the necessary displacement of the platform for reaching a determined point of the plane comprising the two orthogonal axes (X, Z) from any starting point of said plane, said program taking into account the value of the angle (α, α').

18. Device according to claim 1, further comprising measuring means (80, 82, 82') able to detect the position of each carriage along the first axis (X).

19. Device according to claim 18, further comprising measuring means able to detect the position of the platform along the second axis (Z).

20. Tool holder spindle (5) mounted on the platform (4) or constituting said platform of a driving device according to claim 1.

21. Machine-tool equipped with at least one tool holder spindle according to the claim 20.

22. Work piece spindle (5) mounted on the platform (4) or constituting said platform of a driving device according to claim 1.

* * * * *